United States Patent [19]

Archer et al.

[11] Patent Number: 4,843,407

[45] Date of Patent: Jun. 27, 1989

[54] FLUID DISTRIBUTION BAR FOR FLUID-JET PRINTING

[75] Inventors: Timothy H. V. Archer, Centerville; James C. Rouch, Bellbrook, both of Ohio

[73] Assignee: Burlington Industries, Inc., Greensboro, N.C.

[21] Appl. No.: 86,491

[22] Filed: Aug. 18, 1987

[51] Int. Cl.[4] .............................................. G01D 15/18

[52] U.S. Cl. .................................. 346/75; 346/140 R

[58] Field of Search .................. 346/75, 140 A, 140 R

[56] References Cited

U.S. PATENT DOCUMENTS

| | | | |
|---|---|---|---|
| 3,940,773 | 2/1976 | Mizoguchi et al. | 346/140 |
| 4,284,993 | 8/1981 | Kakeno | 346/75 |
| 4,370,663 | 1/1983 | Markham | 346/75 |
| 4,578,686 | 3/1986 | Vollert | 346/140 R |
| 4,638,327 | 1/1987 | Sutera et al. | 346/75 |
| 4,703,330 | 10/1987 | Culpepper | 346/75 |

*Primary Examiner*—E. A. Goldberg
*Assistant Examiner*—Gerald E. Preston
*Attorney, Agent, or Firm*—Nixon & Vanderhye

[57] ABSTRACT

A fluid distribution bar has a plurality of superposed channels with the lower channel in communication with an orifice plate for issuing fluid droplets for deposition on a substrate. The bar is formed from identically cast sections having channel portions opening through a side face thereof which open into one another when the sections are secured each to the other. The channels have a plurality of longitudinally spaced ports providing communication one between the other, the ports communicating between the lower and the intermediate channels being longitudinally offset from the ports communicating between the intermediate and upper channels. The upper surfaces of the lower and intermediate channels are shaped to guide air bubbles in the fluid to the ports such that, as fluid is supplied to the orifice plate, the air bubbles rise in the fluid and pass from one channel to the next through the ports and out of the bar.

18 Claims, 5 Drawing Sheets

FIG. 1
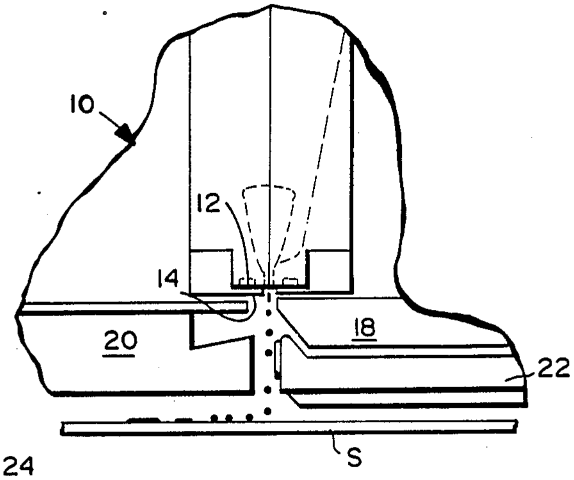
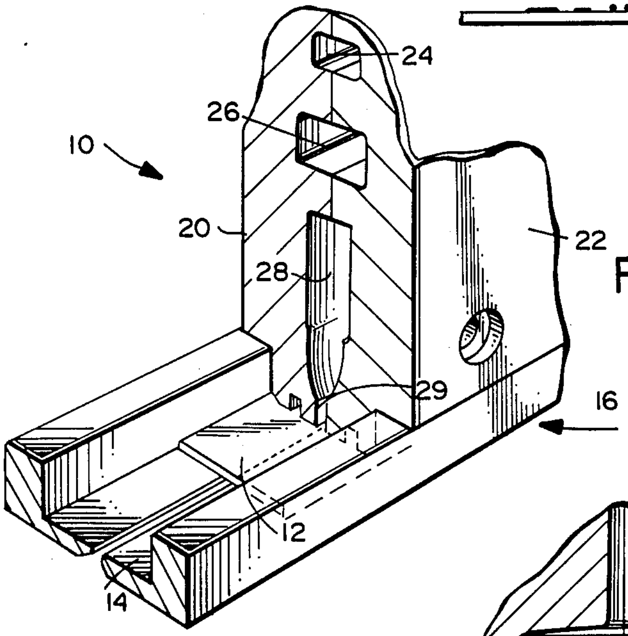
FIG. 2
FIG. 3
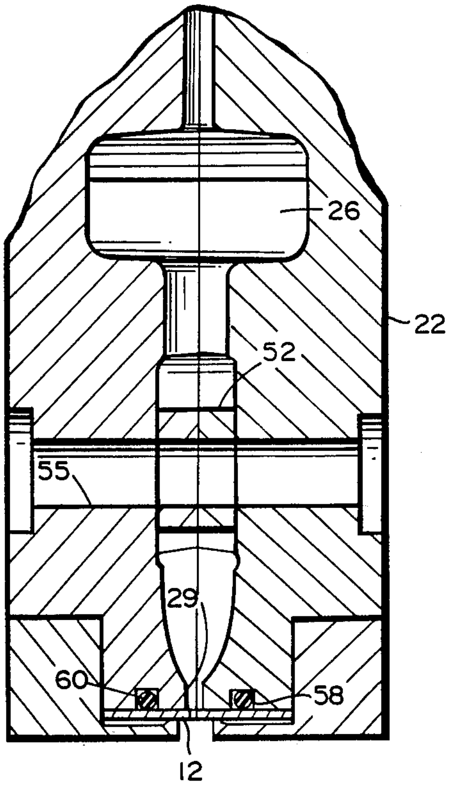

FLUID DISTRIBUTION BAR FOR FLUID-JET PRINTING

BACKGROUND AND SUMMARY OF THE INVENTION

The present invention relates to the field of non-contact fluid marking devices commonly known as "ink-jet" or "fluid-jet" devices. More particularly, the present invention relates to a fluid-jet distribution bar and to methods for forming and assembling a fluid distribution bar used in such non-contact fluid marking devices for flowing fluid through an orifice plat.

Fluid-jet devices in and of themselves are well known. Typically, prior art fluid-jet devices provide a linear array of fluid-jet orifices formed in an orifice plate from which filaments of pressurized fluid (e.g., ink, dye, etc.) are caused to issue from a fluid supply channel. A controllable electrostatic charging electrode is disposed downstream of the orifice plate along the so-called "drop formation" zone. In accordance with well-known principles of electrostatic induction, the fluid filament is caused to assume an electrical potential opposite in polarity and related in magnitude to the electrical potential of its respective charging electrode. When a droplet of fluid separates from the filament, the induced electrostatic charge is then trapped on and in the droplet. Thus, subsequent passage of the charged droplet through an electrostatic field having the same polarity as the droplet charge will cause the droplet to be deflected away from a normal droplet path twoards a droplet catching structure. Uncharged droplets, on the other hand, proceed along a normal path and are eventually deposited upon a substrate.

It will be appreciated that the orifice plate has a linear array of very small orifices having diameters in the range, for example, of about 0.0013–0.01 inches. In fabricating fluid-jet devices of this general type, there is provided a fluid distribution bar having a plenum which supplies fluid to the orifice plate at uniform pressure and minimal turbulence. However, when the orifice array extends a substantial distance, for example 1.8 meters, and recognizing the extremely small orifice size, technical difficulties obtain in providing a uniform fluid supply for distribution through the orifices. For example, air bubbles in the fluid, when confronting the orifices of the orifice plate, have a tendency to prevent the fluid from flowing or distort the fluid flowing through the orifices. This results in a non-uniform flow curtain below the orifice plate, possible interference between adjacent flow streams issuing from the orifices, and possible canting of the flow streams from their desired direction perpendicular to the orifice plate.

Additionally, sagging in the middle of the distribution bar and, hence, the orifice plate, because of their relatively long lengths, must be avoided. Thus, structural problems are a consideration in the design of a distribution bar.

The present invention is directed to a fluid distribution bar and methods of assembly and operation of a fluid distribution bar for use in a fluid-jet printing apparatus. The present invention provides a fluid distribution bar having fluid distribution channels in communication with the orifice plate constructed such that uniform pressure and minimum eddies and turbulence occur in the fluid, the fluid being provided substantially free of air bubbles. To accomplish this, preferably three superposed distribution channels are provided along the bar. Each channel has a separate inlet and outlet. The lowermost and intermediate channels have upper surfaces which are shaped to direct gas, e.g., air bubbles, rising in the fluid in the channels to high points or apices located at longitudinally spaced positions along the channels. These high points are in communication through ports with the next higher channel whereby the air bubbles flow from the lower channel(s) into the higher channel(s). Additionally, the upper surfaces of the intermediate and lower channels are shaped and the ports located to minimize movement of the fluid and, hence, minimize eddy currents and turbulence. Additionally, those ports serve as fluid inlet ports for the lower channel which feeds fluid to the orifice plate for flow through the orifices. Baffles are provided in the form of bosses in the lower channel to avoid direct impingement of the fluid entering the lower chamber through the ports on the orifice plate. The channels are also formed to have smooth continuous uninterrupted surfaces throughout their lengths whereby corners, sharp turns and the like in the channels are avoided, as well as the turbulence and eddy currents associated with such flow paths Additionally, in view of the substantial length of the distribution bar, the need to form the channels as indicated above, and to avoid deflections caused by the weight of the bar, the bar is preferably formed of cast metal. Preferably, the bar is formed from identically cast half-sections of stainless steel. Each half-section has portions of a plurality of internal channels configured, when the bar sections are mated to provide a non-turbulent, substantially damped, flow to the orifice plate. The identically cast half-sections of stainless steel are preferably formed in a conventional casting mold, such as a sand mold. These two half-sections are then joined together along longitudinally extending side faces thereof, for example, by bolts.

A significant feature of the present invention resides in the ability to rapidly change the type or color of the fluid flowing through the channels and orifice plate without stopping fluid flow through the orifices. Shutdown of the flow through the orifices causes substantial problems, both in cleaning the channels and in starting the flow of fluid through the orifice plate. However, it is essential to ensure that the changeover from one fluid type or color to another is accomplished without leaving any residue of the first fluid in the distribution bar. The multiple channels permit such changeover without shutdown, without causing any change in the flow of the fluid filaments through the orifice plate (other than the transition from the first fluid to the second), and without any apparent change from normal operation during the changeover of fluids.

In normal operation, the inlet and outlet for the lower channel are closed, the outlet for the intermediate channel is closed, and a vacuum is applied to the upper channel. Thus, fluid is supplied through the inlet to the intermediate channel and gas is removed from the upper channel. In changeover, however, all three channels are opened at one end of the bar to serve as inlets for receiving the new fluid and all three channels are opened at the other end of the bar to serve as outlets for the old fluid and any mixture of the old and new fluids. Atmospheric or a slightly elevated pressure is maintained in the bar during changeover so that the fluid jets still run. Thus, there is horizontal flow across the bar as the fluid continues to issue through the orifices of the orifice plate. Changeover is in about 50 seconds with acid dyes for a bar about 1.8 meters long, much shorter than if only the middle level channel was used for changeover. Such quick changes can be of importance when using the fluid jet device to apply dyes to fabrics, since multiple color changes may be needed in a relatively short period of time. Thus, fluid of a different type or color may be introduced to one end of the bar into the multiple channels. As the new fluid enters, the old fluid is removed by continuing to issue through the orifices, as well as by flow through the channel outlets at the opposite end of the bar. A restriction is preferably located in the outlets to elevate the pressure in the bar during changeover in order to maintain sufficient pressure to continue the flow through the orifices. The new fluid simply replaces the old fluid as the latter runs out of the bar without the need for shutdown or first draining the old fluid before replacing it with the new fluid. Also, the continuous, smooth nature of the channels permits the new fluid essentially to flush the old fluid from the bar without leaving any residue.

Accordingly, in accordance with the present invention, apparatus is provided for supplying fluid to the orifice plate of a fluid-jet applicator comprising an elongated fluid distribution bar having a pair of elongated channels extending from adjacent one end of the bar to adjacent the opposite end of the bar, one of the channels being disposed above the other channel. Means are carried by the bar defining an inlet for supplying fluid to the channels. Means are additionally provided for defining an elongated slot for flowing the fluid outwardly of the other channel for flow through the orifice plate. Means are also provided defining at least one port providing communication between the channels and further means are provided for directing gases entrained in the fluid in the other channel to the port for flow through the one channel outwardly of the bar.

Preferably, the gas-directing means includes shaped upper surfaces in the other or lower channel which includes a plurality o f high points spaced longitudinally along the upper surface of such other channel coincident with a plurality of ports which are spaced longitudinally one from the other along the bar providing communication between the channels. Additionally, a third channel is disposed above the one or intermediate channel and has a plurality of ports spaced longitudinally therealong providing for communication between the third channel and the one channel, the ports being out of phase with the ports providing communication between the intermediate and lower channels.

In a preferred form of the present invention, the fluid distribution bar is formed of tow identically cast sections, each defining a portion of each channel, together with means for securing the cast sections one to the other to lie on opposite sides of the longitudinal centerline of the bar, with the cast channel portions in opposition one to the other.

In accordance with the present invention, there is also provided a method for forming a fluid distribution bar for use in flowing fluid to an orifice plate in a fluid-jet printing device wherein the bar has at least a pair of channels, one superposed over the other, including the steps of casting two identical elongated sections each defining portion of each channel, with each channel portion opening through a side face of the cast section, providing communication between the channels and securing the cast sections one to the other with the side faces abutting one another and the channel portions opening into one another to form the superposed channels.

In accordance with a further aspect of the present invention, there is provided a method of changing from one type of fluid to another in the fluid distribution bar of a fluid-jet printing device, the bar having at least a pair of channels, one superposed over the other, in communication with one another and an orifice plate comprising the steps of flowing a first fluid into the channels to form a fluid-jet curtain issuing from the orifices through the orifice plate, maintaining the fluid-jet curtain formed by the first fluid, while introducing into the channels a second fluid of a different type, and continuing to maintain the fluid-jet curtain as the second fluid displaces the first fluid in the channels of the distribution bar and in the formation of the fluid-jet curtain whereby the fluid forming the fluid-jet curtain changes from the first fluid to the second fluid.

In a still further aspect of the present invention, there is provided a method of operating the fluid distribution bar of a fluid-jet printing device, the bar having at least a pair of channels, one superposed over the other, in communication with one another and an orifice plate, comprising the steps of flowing a fluid into the channels to form a fluid-jet curtain issuing from the orifice through the orifice plate, applying a vacuum to the fluid in the distribution bar and flowing gases entrained in the fluid from the lower channel into the superposed channel for removal from the distribution bar.

Accordingly, it is a primary object of the present invention to provide a novel and improved fluid distribution bar for use in a fluid-jet device and methods for forming and using such fluid distribution bar for flowing fluid through an orifice plate in a manner enabling gas entrained in the fluid to be removed before it reaches the orifice plate, providing non-turbulent, damped flow of fluid to the orifice plate, and affording quick changeover of fluids from one to another.

These and further objects and advantages of the present invention will become more apparent upon reference to the following specification, appended claims and drawings

BRIEF DESCRIPTION OF THE DRAWING FIGURES

FIG. 1 is a fragmentary elevational view with parts in cross-section of a printhead assembly for an ink-jet device illustrating a portion of a fluid distribution bar constructed in accordance with the present invention;

FIG. 2 is a fragmentary perspective view with parts broken out and in cross-section illustrating the distribution bar hereof, the orifice plate, and clamps therefor;

FIG. 3 is an enlarged fragmentary cross-sectional view illustrating a portion of the distribution bar and orifice plate and taken generally about on line 3—3 in FIG. 8;

DETAILED DESCRIPTION OF THE DRAWING FIGURES

Figure 4:
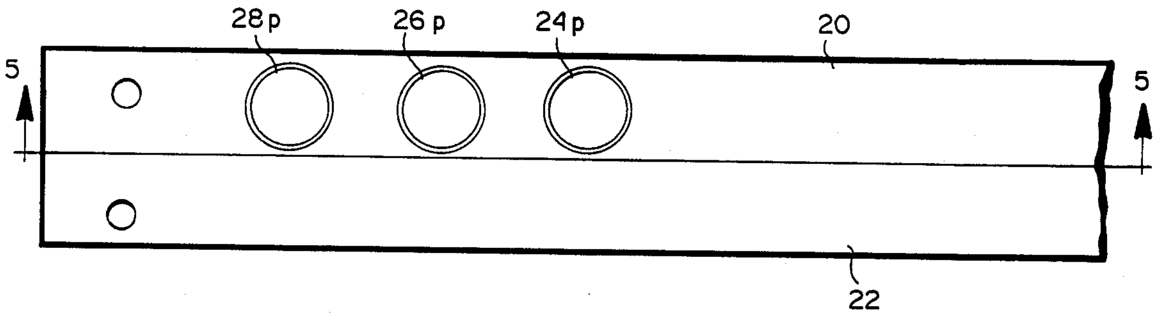
FIG. 4 is a fragmentary plan view of one end of the distribution bar.

Reference will now be made in detail to a preferred embodiment of the invention, an example of which is illustrated in the accompanying drawings.

Referring now to the drawing figures, particularly to FIG. 1, there is illustrated a fluid distribution bar, generally designated 10, constructed in accordance with the present invention, having fluid distribution channels for distribution of fluid through orifices in an orifice plate 12 disposed along the underside of bar 10. Clamps 14 are disposed along the underside of the orifice plate, to clamp the orifice plate to the distribution bar. A longitudinally extending opening is left between the clamps 14, enabling passage of fluid filaments and drops between the clamps. The distribution bar 10, orifice plate 12 and clamps 14 form part of a printhead assembly, generally designated 16.

Referring again to FIG. 1, there is provided along the underside of the distribution bar a charge electrode 18, a deflection electrode 20, and a droplet catcher 22 opposite deflection electrode 20. Underlying the deflection electrode and droplet catcher is a substrate S on which fluid is deposited.

As understood by those familiar with fluid-jet printing devices, fluid is supplied from the fluid distribution bar to the orifice plate and flows through orifices in the orifice plate to emerge on the underside thereof in the form of fluid filaments directed in a downward direction perpendicular to the orifice plate. These filaments receive a charge potential, by means of charge electrode 18, opposite in polarity and related in magnitude to the electrical potential of the charging electrode 18. Charged droplets separated from the fluid filaments are deflected by deflection electrode 20 towards droplet catcher 22, while the uncharged droplets continue downwardly onto the substrate. The present invention provides a novel and improved distribution bar, as well as a method for forming, assembling and using the bar.

In accordance with the present invention, distribution bar 10 comprises a molded stainless steel bar formed of a pair of identical castings 20 and 22, respectively. Each cast section is mated with an identical cast section along opposed longitudinally-extending lateral faces. The castings may be formed in conventional sand molds and joined together as hereinafter explained.

Figure 5:
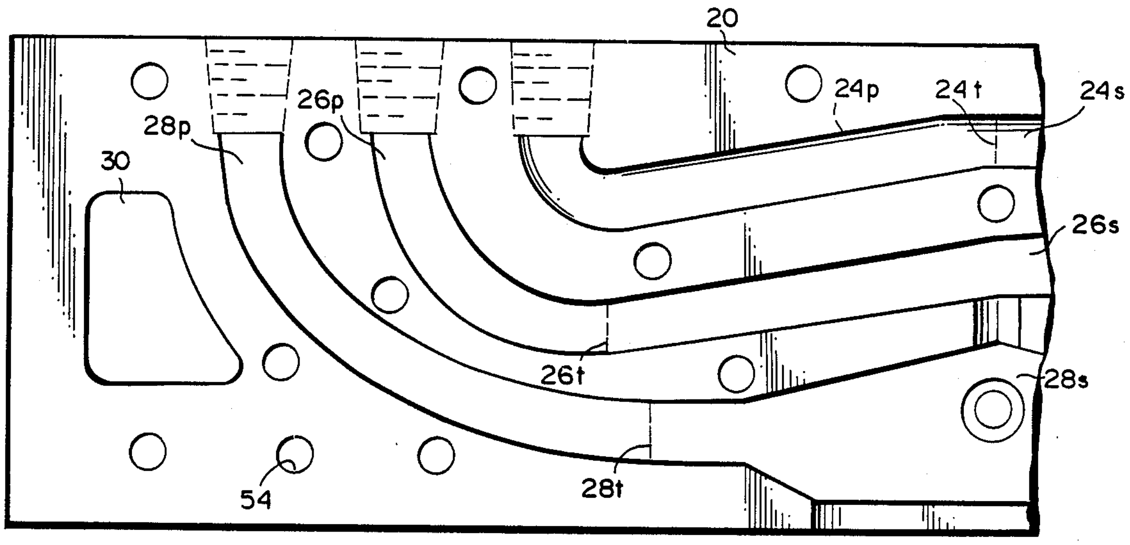
FIG. 5 is a cross-sectional view thereof with parts broken out and in cross-section taken generally about on line 5—5 in FIG. 4.
Figure 6:
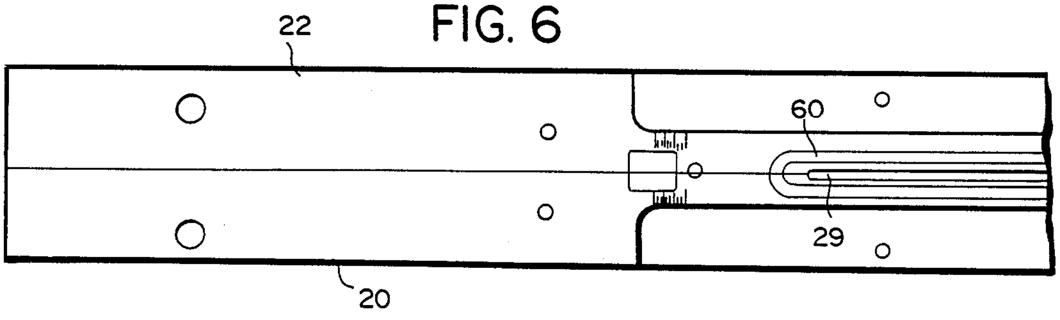
FIG. 6 is a bottom view of the underside of the distribution bar illustrated in FIG. 5.

Referring now to FIGS. 4 through 12, and initially to FIGS. 4 through 6, the cast sections each have channel sections, particularly upper, intermediate and lower channel sections 24s, 26s and 28s, respectively, which open through the longitudinally extending side face of the bar section, which is to be butted against the side face of the adjoining identically cast bar section. It will be appreciated from a review of FIG. 2 that the channel sections 24s, 26s and 28s, in final assembly of the identically cast half-sections of the bar, define upper, intermediate and lower channels 24, 26 and 28, respectively. While an elongated slot 29 is illustrated between opposite mating bar sections 20 and 22 at the lower end of channel 28, as illustrated in FIG. 2, for distribution fluid from the bar to orifice plate 12, slot 29 is formed by machining after the bars are secured one to the other, rather than in the casting process.

Adjacent one end of the bar section as illustrated in FIG. 5, each channel section 24s, 26s and 28s extends laterally into the bar section to a greater extent at transitions 24t, 26t and 28t, respectively, to define passages 24p, 26p and 28p, which remain open to the side as shown in FIG. 5. That is, the channel sections 24s, 26s and 28s form transitions 24t, 26t and 28t with the passages 24p, 26p and 28p at locations along the mating face of the cast half-section where the latter passages angle laterally or more deeply into the associated bar section. The passages 24p, 26p and 28p within bar section 20 then curve upwardly. Openings 29 are later machined and tapped to open through the upper surface of the corresponding bar section to provide communication with the respective passages 24p, 26p and 28p and threaded connections for receiving various fittings, not shown. Tapped openings 29 lie wholly within the bar section and do not open through the side face thereof. A void 30 is provided at the end of the casting to reduce the mass of metal of the bar, as well as to preclude distortions during cooling of the casting.

Figure 7:
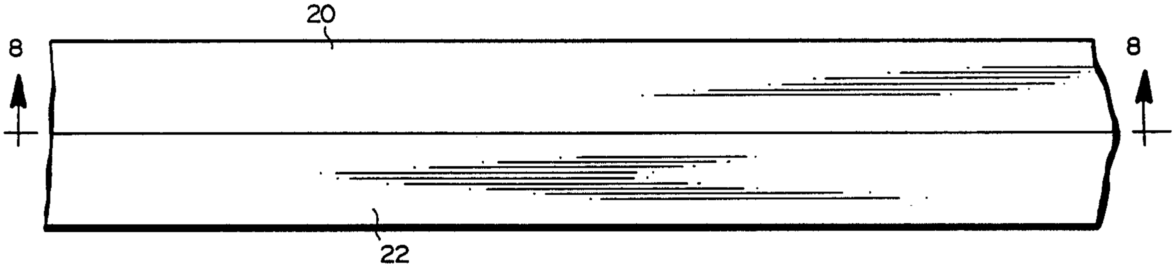
FIG. 7 is a fragmentary top plan view of an intermediate portion of the distribution bar.
Figure 8:
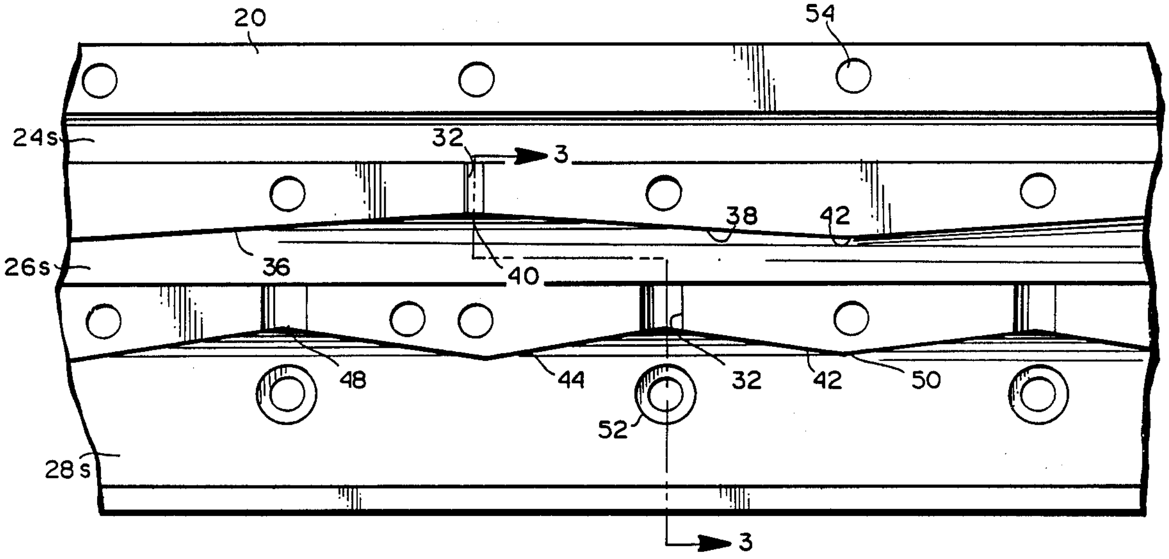
FIG. 8 is a cross-sectional view thereof taken generally about on line 8-8 of FIG. 7 and illustrating the mating face of one of the identically cast half-sections.
Figure 9:
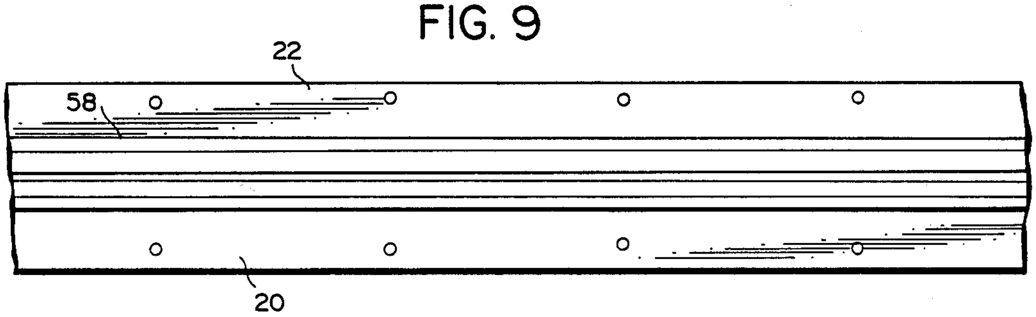
FIG. 9 is a fragmentary bottom plan view of the intermediate portion of the distribution bar.

FIGS. 7 through 9 illustrate portions of the distribution bar intermediate its opposite ends while the channel sections 24s, 26s and 28s thereof are illustrated in FIG. 8. A plurality of fluid communication ports 32 are spaced longitudinally along the bar section providing for communication between the upper and intermediate channels 24s and 26s, respectively. Similarly, a plurality of fluid communication ports 34 are provided between the intermediate and lower channels 26s and 28s, respectively, at longitudinally spaced positions along the length of the bar. From a review of FIG. 8, it will be appreciated that ports 32 and 34 are longitudinally offset one from the other. It will be appreciated that the ports 32 and 34 illustrated in FIG. 8 are, when the casting is made, half-cylindrical recesses which form complete cylindrical ports upon mating assembly of the bar sections.

Also in FIG. 8, the upper surface of intermediate channel section 26s is shaped to provide alternating linear upwardly sloping and downwardly sloping upper wall surfaces 36 and 38, respectively, terminating at an upper high point or apex 40 coincident with the axis of port 32. The juncture of the upwardly sloping and downwardly sloping walls 36 and 38 form low points or lower apices 42. Somewhat similarly, the upper surface of lower channel section 28 has linear upwardly sloping and downwardly sloping surfaces 44 and 46, respectively. The surfaces 44 and 46 meet at an upper apex 48, which lies coincident with the axis of ports 34, and also meet at a lower apex 50 intermediate ports 34. Ports 32 between the upper and intermediate channel sections 24 and 26, respectively, are spaced one from the other twice the longitudinal distance that ports 34 between intermediate and lower channels 26 and 38, respectively, are longitudinal spaced one from the other. Additionally, it will be seen that the surfaces 36 and 38, respectively, of the intermediate channel 26 extend linearly between the lower apices 50 of the upper surface of the lower channel 28.

Figure 11:
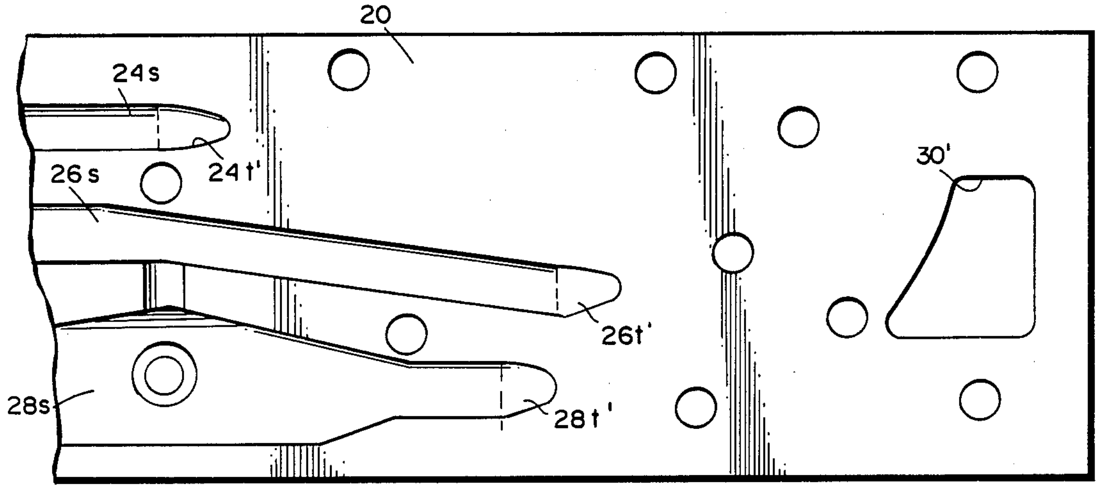
FIG. 11 is a cross-sectional view thereof taken generally about on line 11—11 in FIG. 10 illustrating the mating face at the opposite end of one of the identically cast sections.

FIG. 8 also shows bosses 52 which extend toward the centerline of the bar from the inner side wall of lower channel 28. While apertures 54 for receiving fasteners are illustrated in FIGS. 5, 8 and 11, the openings through bosses 52 and the apertures 54 are not formed in the casting process. Rather, such openings are later formed by machining when the bar sections are joined one to the other to ensure accurate fit.

Figure 10:
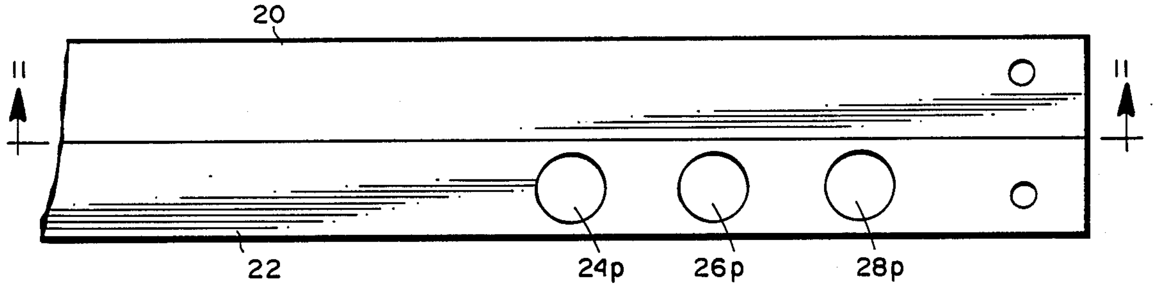
FIG. 10 is a fragmentary plan view of the opposite end of the distribution bar.
Figure 12:
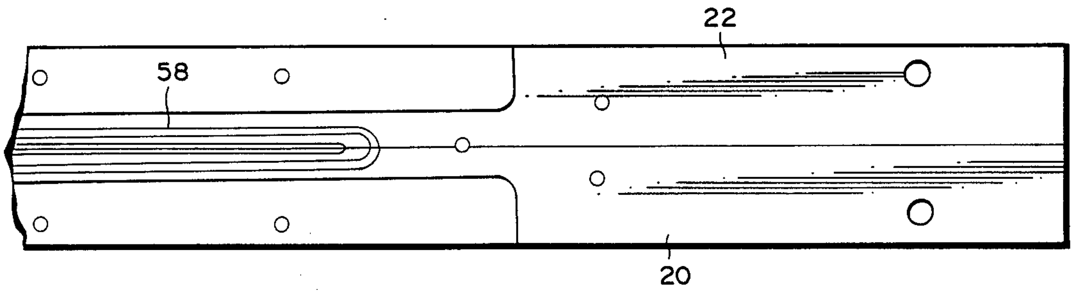
FIG. 12 is a fragmentary bottom view of the end of the distribution bar illustrated in FIG. 10.

Referring now to FIGS. 10–12, there is illustrated the opposite end of cast bar section 20. In FIG. 11, channel sections **24*s*, 26*s* and 28*s* terminate in transitions 24*t*, 26*t*′ and 28*t*′ which open through the mating face of bar section 20 into the transition sections 24*t*, 26*t* and 28*t* of the opposite mating bar section 22 for communication with the passages 24*p*, 26*p* and 28*p* thereof, respectively. A void 30′ is provided in the opposite end of the bar section for like reasons as void 30**.

Figure 13:
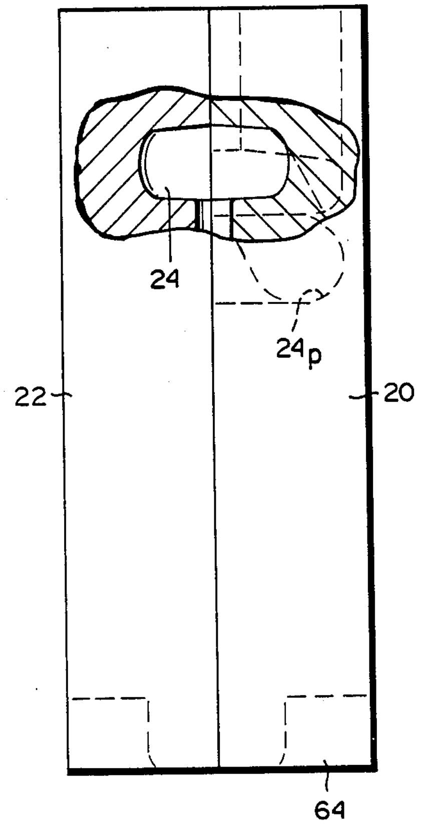
FIGS. 13, 14 and 15 are end elevational views of the distribution bar with parts broken out and in cross-section illustrating the configuration of the upper, intermediate and lower channels together with, in dashed lines, the offset outlets therefor.
Figure 14:
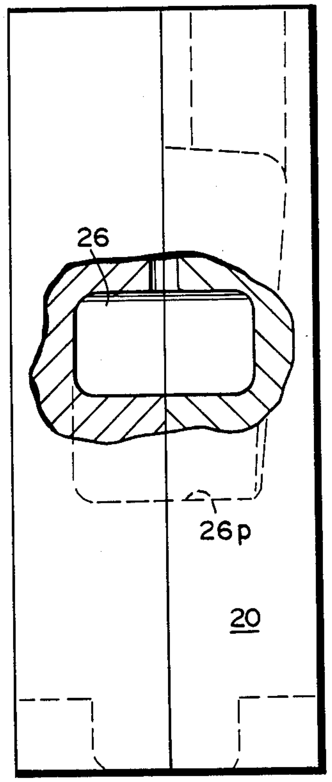
Figure 15:
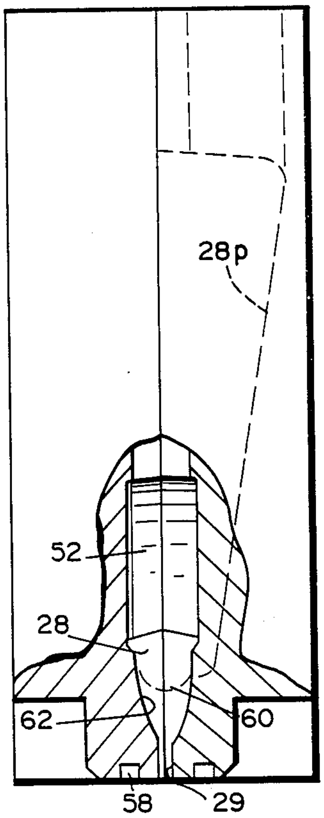

Referring now to FIGS. 13, 14 and 15, the transition sections and the passages **24*p*, 26*p* and 28*p* formed at the lefthand end of the bar, as illustrated in FIG. 5, are clearly shown in relation to the upper, intermediate and lower channel sections, respectively. Additionally, the bar is shown prior to machining. For example, in FIG. 13, upper channel 24 has its transition illustrated by the dashed lines extending downwardly and to the right, the passage 24*p* being illustrated by the vertical dashed lines extending through the upper edge of section 20. Similarly, the FIG. 14, intermediate channel section 26 has its transition in bar section 20 in communication with the passage 26*p*, which extends upwardly to open through the upper face of section 20. FIG. 15 illustrates the lower channel 28 and its transition illustrated by the dashed lines to the passage 28*p* opening through the upper face of section 20. Additionally, bosses 52 of the adjoining sections 20 and 22** are illustrated.

In FIGS. 13, 14 and 15, the bar sections 20 and 22 are illustrated in full line prior to machining, with the lower channel's exit slot 29 illustrated in FIG. 15 being illustrated by dashed lines subsequent to machining.

As indicated previously, each bar section 20 and 22 is formed of an identical casting, for example, in a sand mold. Once formed, the castings are machined to assure flatness of their mating surfaces. The cast sections are then disposed end-to-end and joined, using an anaerobic sealant. In joining the sections one to other, it will be seen that the channel sections, ports, transitions and bosses are aligned one with the other. Holes 54 are then drilled through the combined bar sections and the sections are bolted one to the other. Holes 55 (FIG. 8) in the lowermost portion of the bar sections are also drilled through bosses 52 formed in the mated casting. Once the bar sections are secured one to the other using bolts, not shown, passing through the openings 54 and 55, the lower face of the bar is machined to remove excess metal along the side margins, to form the elongated slot 29 in communication with lower channel 28, and to form a pair of side-by-side elongated recesses 58 for receiving seals 60.

To form the fluid distribution bar 10, the bar sections 20 and 22 are cast of stainless steel in a conventional sand mold. The molds are identical one with the other and, hence, the cast sections are identical. As illustrated in FIG. 15, the bar sections once formed are machined in part prior to assembly and in part subsequent to assembly. In FIG. 15, it will be seen that a portion of the lower chamber 28 is defined by a casting surface 61, which is machined before assembly of the bar sections one to the other to obtain the machined surface 62. The bar section passages **24*p*, 26*p* and 28*p* at the locations where they open through the upper faces of the bars are tapped prior to assembly to provide the connections with various fluid lines. The bar sections are then mated along their longitudinally opposed faces such that the bar channel sections 24*s*, 26*s* and 28*s* open one into the other to complete the channels 24, 26 and 28, respectively. The ports 32 and 48** likewise mate with opposing ports to form cylindrical openings between the channels.

Note that the grooves 58 for seal 60 form a continuous groove about the slot 29. Seal 60 thus extends continuously about opening 29. Referring to FIG. 13, lower opposite edge portions 64 of the bar sections are also machined to provide elongated recesses which cooperate with the clamp structure 14, as shown in FIGS. 1–3.

To use the fluid distribution bar hereof, the orifice plate 12 is clamped along the underside of the bar, with its orifices in communication with the slot 29 and, hence, in communication with the channels of the bar. Once the bar is in position in the fluid-jet printing device, fluid is supplied to the channels through inlet openings at one end of the channels opening into passages **24*p*, 26*p* and 28*p*, respectively. As explained in another patent application filed on behalf of assignee, a vacuum is applied to the underside of the orifice plate to draw the fluid in the channels through the orifices and into a catcher tray in order to start the fluid filaments. Thus, it will be appreciated that fluid flows into the three channels simultaneously. Significantly, the bosses 52 lie in vertically spaced position below the ports 48 to prevent direct impingement of the fluid flowing through ports 48 downwardly into lower channel 28 onto the orifice plate 12. Thus, a more uniform application of the fluid to the orifice plate is provided. Also, it will be appreciated that the upwardly and downwardly sloping surfaces 44 and 46 of the lower channel and corresponding channels 36 and 38** of the intermediate channel tend to direct the gas entrained in the fluid upwardly to the high points or apices of the upper surfaces of the respective channels. It will be noted that such high points lie coincident with the ports whereby entrained gas escapes through the ports into the channel above the port. Each port therefore serves as a fluid communication channel for supplying fluid from one channel to the underlying channel, as well as a port for enabling egress of gas from the underlying channel to the overlying channel. In this manner, gas entrapped in the fluid and which is deleterious to the effective formation and continued flow of fluid filaments in a direction perpendicular to the orifice plate is removed from the channels without causing significant eddies or turbulence within the channels.

Once starting is achieved, the ports of the lower channel 28 are closed, the outlet port of channel 26 is closed and chamber 24 is put in communication with a vacuum through either of its ports, to take away air reaching chamber 24 as bubbles from the fluid. Thus, fluid flows into intermediate channel 26 through its inlet port at one end for flow through the intermediate and lower channels to the orifice plate.

To change fluids, all three chambers have their respective ports at one end open to drain and the opposite ports opened to receive the new fluid. The vacuum pressure is also removed. This causes a sweeping away of the old fluid across the length of the bar and its replacement with new fluid. Once the new fluid has completely replaced the old fluid, the lower chamber ports may be reclosed, the outlet port of the intermediate chamber may be closed and the upper chamber is reconnected to the vacuum.

It will be understood that although the fluids being discharged from the orifice plate during changeover contaminate one another, they may all be collected in the catcher 22 and directed to waste. Since changeover is accomplished rapidly, the amount of waste is minimal. thus, color changes of dyes for fabric as a substrate S may be accomplished quite rapidly.

Thus, it will be seen that the objectives of the present invention are fully accomplished in that there has been provided a novel and improved fluid distribution chamber for an fluid-jet printing device and a method of forming and operating the bar which affords improved flow of the fluid through the chamber and orifices.

While the invention has been described in connection with what is presently considered to be the most practical and preferred embodiment it is to be understood that the invention is not to be limited to the disclosed embodiment, but on the contrary, is intended to cover various modifications and equivalent arrangements included within the spirit and scope of the appended claims.

What is claimed is:

1. Apparatus for supplying fluid to the orifice plate of a fluid-jet applicator assembly comprising:

a generally horizontally disposed elongated fluid distribution bar having first and second elongated channels extending from adjacent one end of said bar to adjacent the opposite end of said bar, said second channel being disposed above said first channel;

means carried by said bar defining an inlet for supplying fluid to said channels;

means carried by said bar defining an elongated slot for flowing fluid outwardly of said first channel for flow through the orifice plate;

means carried by said bar defining at least one port providing communication between said channels; and means carried by said bar for directing gases entrained in the fluid in said first channel to said port for flow through said second channel outwardly of said bar.

2. Apparatus according to claim 1 wherein said directing means includes a shaped upper surface in part defining said first channel.

3. Apparatus according to claim 2 including a plurality of ports spaced longitudinally one from the other along said bar and providing communication between said channels, said shaped upper surface including high points at spaced longitudinal positions along the upper surface of said first channel, said high points being substantially coincident with said ports.

4. Apparatus according to claim 1 including a plurality of first ports spaced longitudinally one from the other along said bar and providing communications between said channels, means carried by said bar defining a third channel disposed above said second channel and extending from adjacent one end of said bar to adjacent its opposite end and a plurality of second ports spaced longitudinally one from the other providing for communication between said third channel and said second channel, said second ports being longitudinally out of phase with said first ports.

5. Apparatus according to claim 4 including means carried by said bar for directing gases entrained in the fluid in said second channel to said second ports for flow through said third channel outwardly of said bar, the latter directing means including a shaped upper surface in part defining said second channel, said shaped upper surface including high points at spaced longitudinal positions along said second channel, said high points being substantially coincident with said second ports.

6. Apparatus according to claim 5 wherein the first mentioned directing means includes a shaped upper surface in part defining said first channel, said shaped upper surface including high points at spaced longitudinal positions along said first channel, the latter high points being substantially coincident with said first ports.

7. Apparatus according to claim 1 wherein said bar is comprised of two identically cast sections each defining a portion of each channel, means securing said cast sections one to the other to lie on opposite sides of the longitudinal centerline of said bar with the cast channel portions in opposition to one another.

8. Apparatus according to claim 7 wherein said inlet comprises a passage through said bar defined wholly by one of said cast sections.

9. Apparatus according to claim 8 including means carried by said bar defining an outlet for said channels, said outlet comprising a passage through said bar defined wholly by the other of said cast sections.

10. Apparatus for supplying fluid to the orifice plate of a fluid-jet applicator assembly comprising:

a generally horizontally disposed elongated fluid distribution bar having a pair of elongated channels extending from adjacent one end of said bar to adjacent the opposite end of said bar, one of said channels being disposed above the other channel;

means carried by said bar defining an inlet for supplying fluid to said channels;

means carried by said bar defining an elongated slot for flowing fluid outwardly of said other channel for flow through the orifice plate; and means carried by said bar defining a plurality of ports spaced longitudinally one from the other and providing communication between said channels.

11. Apparatus according to claim 10 wherein said bar has shaped upper surfaces defining part of said other channel, said shaped upper surfaces including high and low points at spaced longitudinal positions along said other channel, said high points being substantially coincident with said ports.

12. Apparatus according to claim 10 including means carried by said bar defining a third channel disposed above said one channel and extending from adjacent one end of said bar to adjacent its opposite end and a plurality of second ports spaced longitudinally one from the other providing for communication between said third channel and said one channel, the latter ports being longitudinally out of phase with the first mentioned ports.

13. Apparatus according to claim 10 wherein said bar is comprised of two identically cast sections each defining a portion of each channel, means securing said cast sections one to the other to lie on opposite sides of the longitudinal centerline of said bar with the cast channel portions in opposition to one another.

14. Apparatus according to claim 13 wherein said inlet to said channels comprises a passage through said bar defined wholly by one of said cast sections.

15. Apparatus according to claim 14 including means carried by said bar defining an outlet for said other channel, said outlet comprising a passage through said bar defined wholly by the other of said cast sections.

16. Apparatus for supplying fluid to the orifice plate of a fluid-jet applicator assembly comprising:

an elongated fluid distribution bar having an elongated channel extending from adjacent one end of said bar to adjacent the opposite end of said bar;

means carried by said bar defining an inlet for supplying fluid to said channel;

means carried by said bar defining an outlet for removing fluid from said channel;

said bar being comprised of two identically cast sections each defining a portion of said channel, means securing said cast sections one to the other to lie on opposite sides of the longitudinal centerline of said bar with the cast channel portions in opposition to one another.

17. Apparatus according to claim 16 wherein said inlet comprises a passage through said bar defined wholly by one of said cast sections.

18. Apparatus according to claim 17 wherein said outlet comprises a passage through said bar defined wholly by the other of said cast sections.

* * * * *